(12) United States Patent
Boyd et al.

(10) Patent No.: US 7,823,007 B2
(45) Date of Patent: Oct. 26, 2010

(54) APPARATUS, SYSTEM, AND METHOD FOR SWITCHING A VOLUME ADDRESS ASSOCIATION IN A POINT-IN-TIME COPY RELATIONSHIP

(75) Inventors: Kenneth W. Boyd, Tucson, AZ (US); Kenneth F. Day, III, Tucson, AZ (US); Stephen F. Edel, San Jose, CA (US); John J Wolfgang, Winston-Salem, NC (US); Harry M. Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1057 days.

(21) Appl. No.: 11/357,375

(22) Filed: Feb. 17, 2006

(65) Prior Publication Data
US 2007/0220312 A1 Sep. 20, 2007

(51) Int. Cl.
*G06F 11/00* (2006.01)
(52) U.S. Cl. ............... 714/6; 714/5; 714/42; 711/162
(58) Field of Classification Search ............ 714/5, 714/6, 15, 19, 20, 42; 711/161, 162
See application file for complete search history.

(56) References Cited

U.S. PATENT DOCUMENTS

| | | | |
|---|---|---|---|
| 5,021,993 A | 6/1991 | Matoba et al. | 712/228 |
| 5,327,531 A | 7/1994 | Bealkowski et al. | 714/6 |
| 5,349,655 A | 9/1994 | Mann | 714/6 |
| 6,006,323 A | 12/1999 | Ma et al. | 712/202 |
| 6,078,932 A * | 6/2000 | Haye et al. | 707/204 |
| 6,170,054 B1 | 1/2001 | Poplingher | 712/242 |
| 6,289,444 B1 | 9/2001 | Nair | 712/243 |
| 6,473,856 B1 | 10/2002 | Goodwin et al. | 713/2 |
| 6,618,794 B1 * | 9/2003 | Sicola et al. | 714/6 |
| 6,633,974 B1 * | 10/2003 | Sinharoy | 712/237 |
| 6,665,813 B1 | 12/2003 | Forsman et al. | 714/15 |
| 6,742,138 B1 | 5/2004 | Gagne et al. | 714/6 |
| 6,799,258 B1 * | 9/2004 | Linde | 711/162 |
| 6,871,271 B2 | 3/2005 | Ohran et al. | 711/162 |

(Continued)

FOREIGN PATENT DOCUMENTS

CN 1498008 5/2004

(Continued)

*Primary Examiner*—Robert Beausoliel
*Assistant Examiner*—Joseph D Manoskey
(74) *Attorney, Agent, or Firm*—Kunzler Needham Massey & Thorpe

(57) ABSTRACT

An apparatus, system, and method are disclosed for switching a volume address association in a point-in-time copy relationship. A copy module creates a point-in-time copy structure of a source volume at a target volume. A migration module copies data from the source volume to the target volume. A detection module detects data corruption in the source volume. A switch module switches a logical volume address from a source volume address of the source volume to a target volume address of the target volume in response to detecting the data corruption, redirecting data reads and writes to the target volume. In one embodiment, a tracking module tracks a current target volume copy of source volume data and redirects an access for source volume data without the current target volume copy to the source volume.

20 Claims, 6 Drawing Sheets

U.S. PATENT DOCUMENTS

| | | | |
|---|---|---|---|
| 7,149,858 B1 * | 12/2006 | Kiselev ............................ | 714/6 |
| 2003/0005235 A1 * | 1/2003 | Young ........................ | 711/141 |
| 2004/0123031 A1 * | 6/2004 | Kiselev et al. .............. | 711/162 |
| 2004/0260899 A1 * | 12/2004 | Kern et al. .................. | 711/162 |
| 2005/0160243 A1 * | 7/2005 | Lubbers et al. ............. | 711/162 |
| 2005/0166138 A1 | 7/2005 | Kundu | |

FOREIGN PATENT DOCUMENTS

| | | |
|---|---|---|
| EP | 767431 | 4/1997 |
| WO | WO 0007106 | 2/2000 |

* cited by examiner

APPARATUS, SYSTEM, AND METHOD FOR SWITCHING A VOLUME ADDRESS ASSOCIATION IN A POINT-IN-TIME COPY RELATIONSHIP

BACKGROUND OF THE INVENTION

1. Field of the Invention

This invention relates to switching a volume address association and more particularly relates to switching a volume address association in a point-in-time copy relationship.

2. Description of the Related Art

Data processing devices ("DPD") such as mainframe computers, servers, computer workstations, laptop computers, portable digital assistants, embedded processing nodes, and the like often store data to and retrieve data from a storage device. The storage device may be a hard disk drive, an optical storage device, a micromechanical storage device, a semiconductor storage device, or the like. A plurality of storage devices may be organized as a storage system.

A DPD may store data to and retrieve data from a logical volume of a storage system and/or a storage device. The logical volume may comprise portions of one or more storage devices. In addition, the logical volume may appear to the DPD as a single logical storage device. For example, a server DPD may access data from a logical volume organized as four hard disk drives of a storage system, wherein the logical volume appears to the server as a single storage device.

The data stored in the logical volume is often very valuable. Unfortunately, the data may be lost due to corruption. Storage device failure, invalid transactions, write errors, and software viruses may corrupt data. As a result, a DPD and/or storage system may frequently backup the data of the logical volume to protect the data. For example, the data of a source logical volume, herein referred to as a source volume, may be copied to a target logical volume, herein referred to as a target volume, as a flash copy such as by using the FlashCopy® Solutions software from International Business Machines Corporation ("IBM") of Armonk, N.Y. The flash copy is a point-in-time instance of the source volume data.

If the source volume data becomes corrupted before the full copy from the source volume to the target volume has completed, the copy to the target volume must be completed before data can be recovered to the source volume. Unfortunately, recovering data by copying the data from the source volume to the target volume may be a lengthy process, particularly for source volumes that store significant amounts of data. While completing the copy to the target volume, the point in time version of the source volume data is unavailable at the source volume. The data recovery process may take many hours, during which time the DPD and/or storage system may be unable to access needed data. The loss of data access can be expensive, particularly in transaction and data intensive enterprise applications.

Alternatively, an administrator may change the DPD configuration to access the target volume, which is time consuming and error prone. After copying all data to the target volume, and then doing another flash copy back to the source volume, the DPD has access to the source volume with valid data while the target volume to source volume flash copy completes.

From the foregoing discussion, it should be apparent that a need exists for an apparatus, system, and method that support rapid access to point-in-time copies of data. Beneficially, such an apparatus, system, and method would speed the recovery process for corrupted data.

SUMMARY OF THE INVENTION

The present invention has been developed in response to the present state of the art, and in particular, in response to the problems and needs in the art that have not yet been fully solved by currently available data recovery methods. Accordingly, the present invention has been developed to provide an apparatus, system, and method for switching a volume address association that overcome many or all of the above-discussed shortcomings in the art.

The apparatus to switch a volume address association in a point-in-time copy relationship is provided with a plurality of modules configured to functionally execute the necessary steps of creating a point-in-time copy structure, copying data, detecting data corruption, and switching a logical volume address. These modules in the described embodiments include a copy module, a migration module, a detection module, and a switch module.

The copy module creates a point-in-time copy structure of a source volume at a target volume. The point-in-time copy structure may be for a flash copy. The point-in-time copy structure may share an organization with the source volume. The migration module copies data from the source volume to the target volume. In one embodiment, the migration module copies the data block to the point-in-time copy structure.

The detection module detects data corruption in the source volume. The detection module may be embodied in a DPD software application. In addition, the detection module may also be embodied in an operating system. The switch module switches a logical volume address from a source volume address of the source volume to a target volume address of the target volume in response to detecting the data corruption. Switching the logical volume address redirects an access such as a read and/or a write from the source volume to the target volume. Thus the apparatus allows rapid access to the data of the target volume including the point-in-time copy without completing the copy of all data from the source volume to the target volume, completing the flash copy relationship from the source volume to the target volume, and creating a new flash copy relationship from the target volume to the source volume.

A system of the present invention is also presented to switch a volume address association in a point-in-time copy relationship. The system may be embodied in storage system. In particular, the system, in one embodiment, includes a source volume, a target volume, a detection module, and a storage controller. The storage controller may include a copy module, a migration module, a switch module, and a tracking module.

The source and target volume are logical volumes. Each may comprise portions of one or more storage devices. The storage controller manages the source and target volumes. In addition, the storage controller may store data to and retrieve data from the source and target volumes for a DPD.

The source volume stores data for the DPD. The copy module creates a point-in-time copy structure of the source volume at the target volume. The migration module copies data from the source volume to the point-in-time copy structure of the target volume. The detection module detects data corruption in the source volume. In one embodiment, the storage controller comprises the detection module.

The switch module switches a logical volume address from a source volume address of the source volume to a target volume address of the target volume in response to detecting the data corruption. The tracking module may track a current target volume copy of source volume data and redirect an access for source volume data without a current target volume copy to the source volume.

In one embodiment, the migration module migrates each source volume data block without a target volume copy to the target volume. The system recovers data by switching the logical volume address for accessing the data from the source volume to the target volume, supporting rapid access to backup data including the point-in-time copy.

A method of the present invention is also presented for switching a volume address association in a point-in-time copy relationship. The method in the disclosed embodiments substantially includes the steps necessary to carry out the functions presented above with respect to the operation of the described apparatus and system. In one embodiment, the method includes creating a point-in-time copy structure, copying data, detecting data corruption, and switching a logical volume address.

A copy module creates a point-in-time copy structure of a source volume at a target volume. A migration module copies data from the source volume to the target volume. A detection module detects data corruption in the source volume. A switch module switches a logical volume address from a source volume address of the source volume to a target volume address of the target volume in response to detecting the data corruption. In one embodiment, the tracking module tracks a current target volume copy of source volume data and redirects an access for source volume data without the current target volume copy to the source volume. The method provides rapid access to the data of the target volume by switching the logical volume address from the source volume address to the target volume address.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiment of the present invention switches a volume address association in a point-in-time copy relationship in response to data corruption to provide rapid access to data. In addition, the embodiment of the present invention may seamlessly recover the data. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
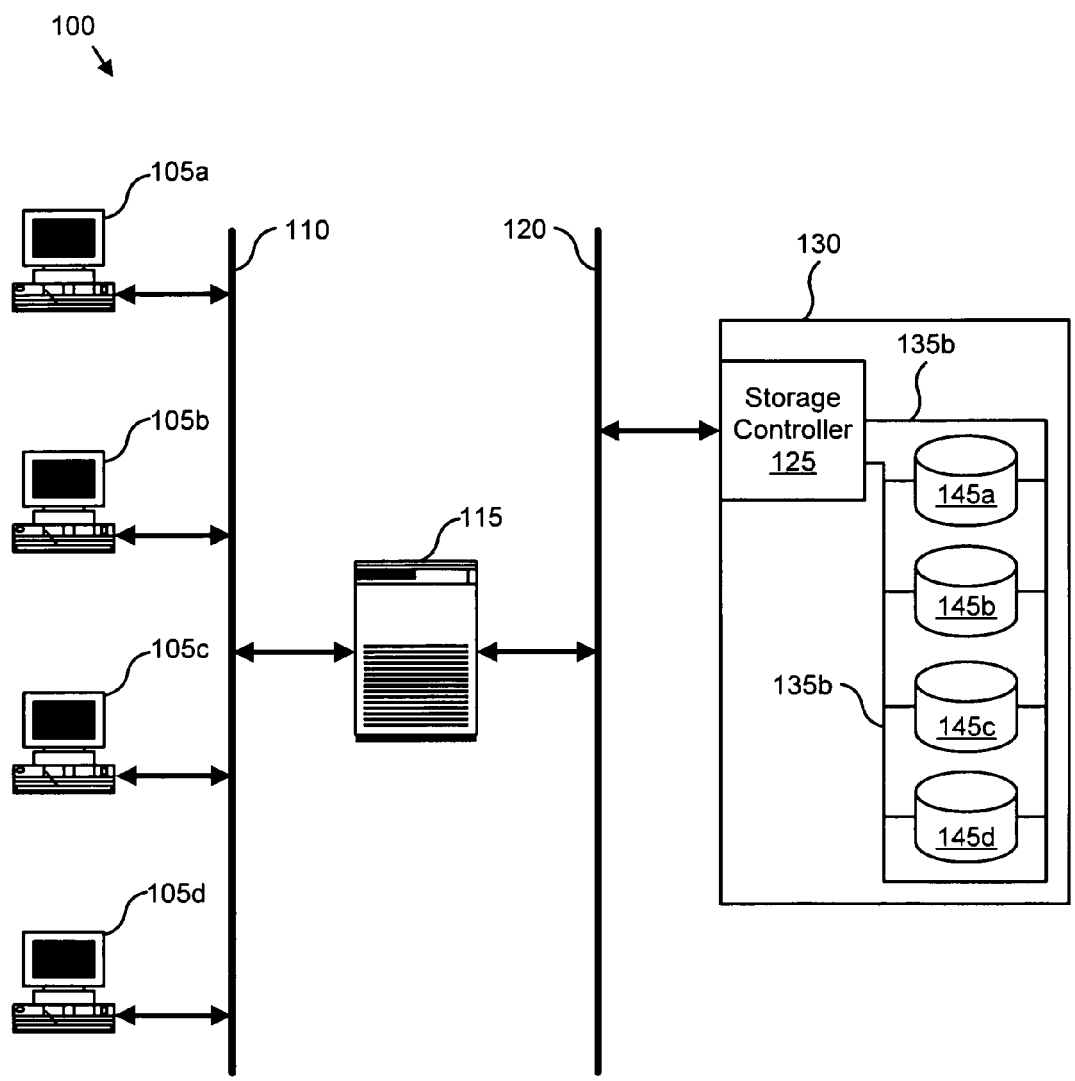
FIG. 1 is a schematic block diagram illustrating one embodiment of a data processing system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable storage medium may take any form capable of causing execution of a program of machine-readable instructions on a digital processing apparatus. A computer readable storage medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of a data processing system 100 in accordance with the present invention. The system 100 includes one or more DPD 105, a network 110, a storage server 115, a storage network 120, and a storage system 130. The storage system 130 further includes a storage controller 125 communicating with one or more storage devices 145 over a communications channel 135. Although for simplicity the system 100 is depicted with four DPDs 105, one network 110, one storage server 115, one storage network 120, and one storage system 130 comprising one storage controller 125 and four storage devices 145, any number of DPDs 105, networks 110, storage servers 115, storage networks 120, storage systems 130, storage controllers 125, and storage devices 145 may be employed.

Each DPD 105 may store data to and retrieve data from the storage system 130 through the storage server 115. The storage server 115 accesses the storage controller 125 to store the data to and retrieve the data from the storage devices 145. The storage controller 125 may manage the storage devices 145. For example, the storage controller 125 may initialize a storage device 145, and connect and/or disconnect a storage device 145. The storage controller 125 may also organize portions of one or more storage devices 145 as a logical volume. In one embodiment, a DPD 105 may store data to and retrieve data from a logical volume.

Figure 2:
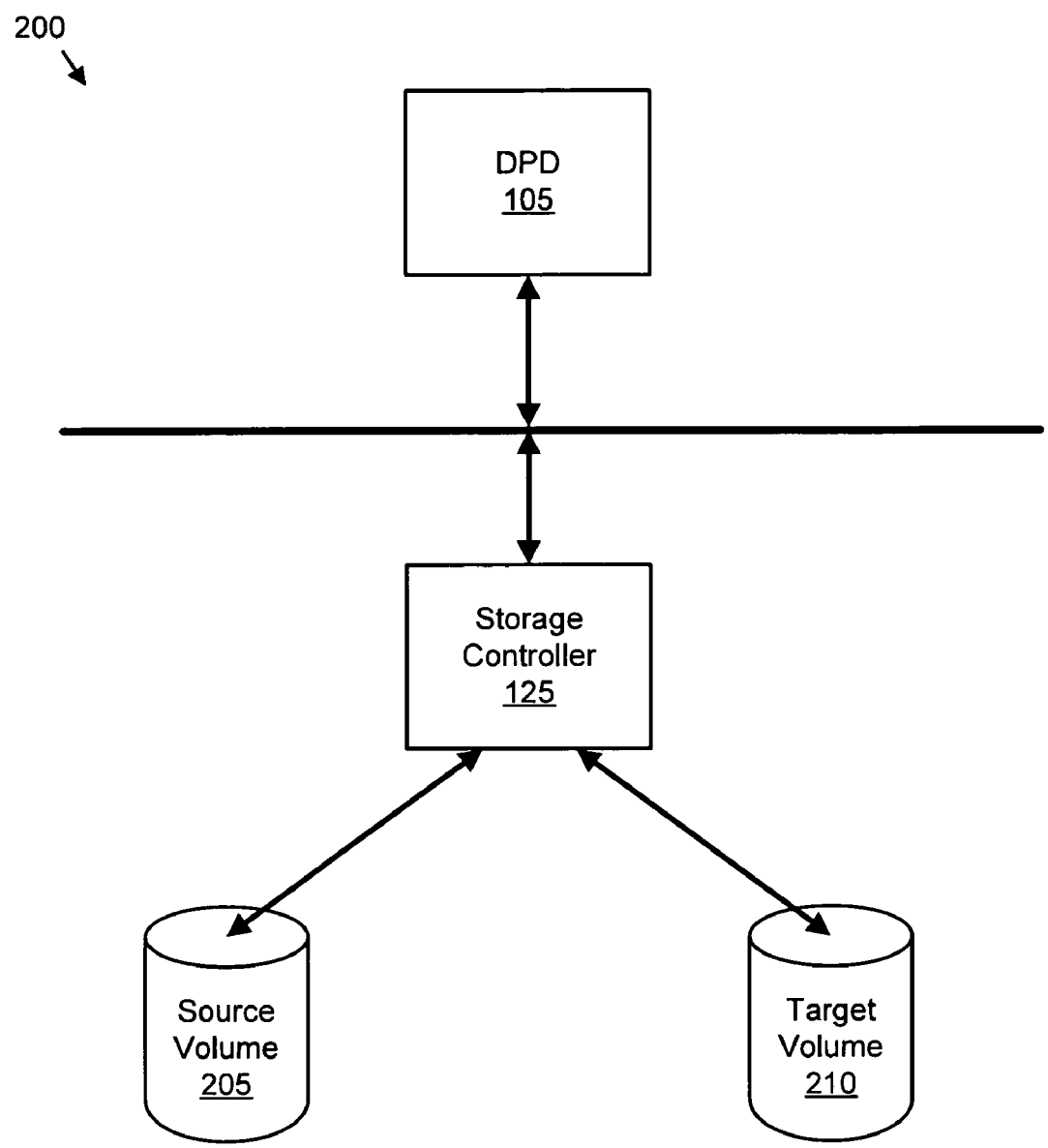
FIG. 2 is a schematic block diagram illustrating an alternate embodiment of a data processing system in accordance with the present invention.

FIG. 2 is a schematic block diagram illustrating an alternate embodiment of a data processing system 200 in accordance with the present invention. The system 200 includes elements of FIG. 1, like numbers referring to like elements. In addition, the system 200 may be embodied by the system 100 of FIG. 1.

The DPD 105 stores data in a source volume 205. The source volume 205 may comprise portions of one or more storage devices 145. The target volume 210 may also comprise portions of one or more storage devices 145. In one embodiment, the data of the source volume 205 is copied to the target volume as a point-in-time copy such as a flash copy. The point-in-time copy represents an instance of the data of the source volume 205 at the time the point-in-time copy is created.

The source volume 205 and the target volume 210 may each have a logical volume address. The DPD 105 may access the source volume 205 and/or the target volume 210 using the logical volume address of the source volume and/or target volume. In one embodiment, the storage controller 125 may convert the logical volume address to one or more physical addresses. For example, the storage controller 125 may convert the logical volume address of the source volume 205 to the physical address of a storage device 145 such as '196.'

In one embodiment, the target volume 210 is organized with the structure of the source volume 205. For example, the target volume 210 may be organized with the directory structure of the source volume 205. Alternatively, the target volume 210 and source volume 205 may have a common internal address scheme.

Figure 3:
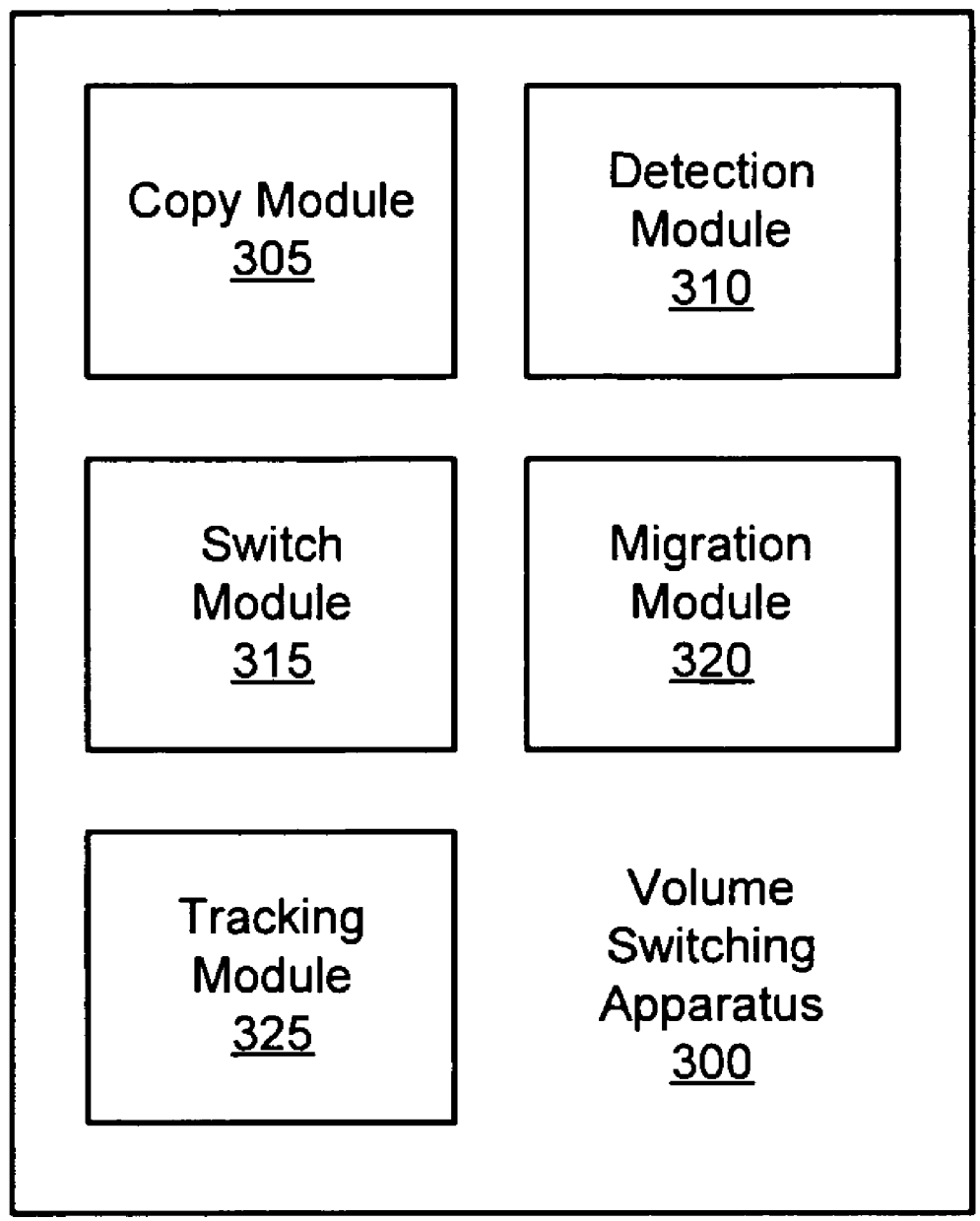
FIG. 3 is a schematic block diagram illustrating one embodiment of a volume switching apparatus of the present invention.

FIG. 3 is a schematic block diagram illustrating one embodiment of a volume switching apparatus 300 of the present invention. The apparatus 300 may be embodied in the storage controller 125, DPD 105, and/or storage server 115 of FIGS. 1 and 2. In addition, the description of the apparatus 300 refers to elements of FIGS. 1 and 2, like numbers referring to like elements. The apparatus 300 includes a copy module 305, detection module 310, switch module 315, migration module 320, and tracking module 325.

The copy module 305 creates a point-in-time copy structure of a source volume 205 at a target volume 210. The point-in-time copy may share an organization with the source volume 205. For example, the point-in-time copy may replicate a file structure of the source volume 205.

The migration module 320 copies data from the source volume 205 to the target volume 210. In one embodiment, the migration module 320 copies the data to create a point-in-time copy of the source volume 205 in the point-in-time copy structure of the target volume 210.

The detection module 310 detects data corruption in the source volume 205. In one embodiment, the detection module 310 is embodied in the storage controller 125. The detection module 310 may also be embodied in a software application and/or an operating system that execute on a DPD 105.

The switch module 315 switches a logical volume address from a source volume address of the source volume 205 to a target volume address of the target volume 210 in response to detecting the data corruption. Switching the logical volume address redirects an access for the source volume 205 to the target volume 210. The DPD 105 will continue to access the logical volume address of the source volume 205, but will actually be accessing the target volume 210 without any action required by the DPD.

The tracking module 325 tracks a current target volume copy of source volume data. For example, the tracking module 325 may maintain a bit map that tracks target volume copies of data blocks. A data block may comprise a specified number of data bytes, such as five hundred and twelve (512) bytes. The bit map may record if a current target volume copy of a source volume data block exists. Alternatively, the tracking module 325 may maintain a linked list with an entry for each directory and/or file of the source volume 205. The linked list may record if a current copy of the directory and/or file resides on the target volume 210.

Figure 4:
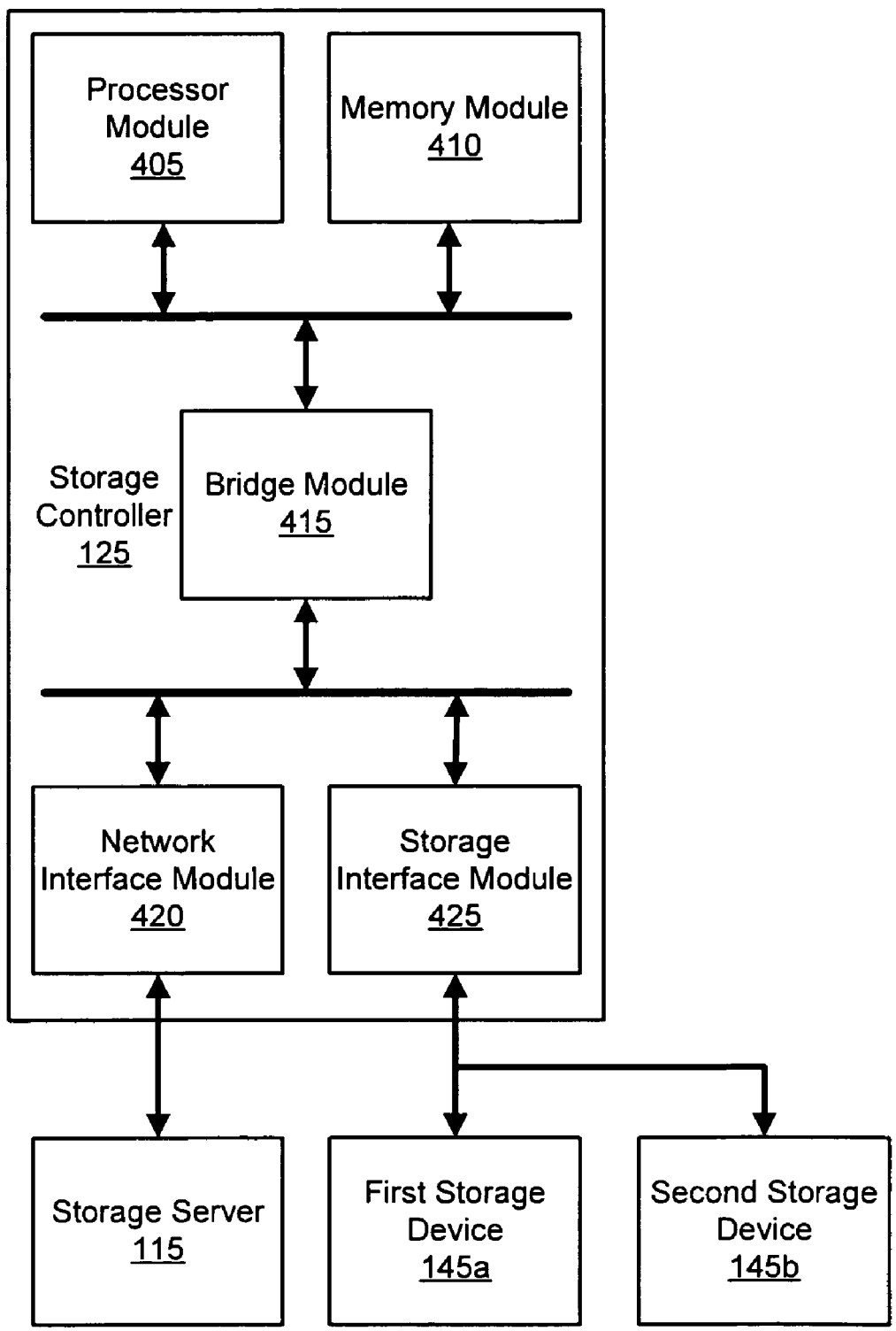
FIG. 4 is a schematic block diagram illustrating one embodiment of a storage controller of the present invention.

FIG. 4 is a schematic block diagram illustrating one embodiment of a storage controller 125 of the present invention. The storage controller 125 may be the storage controller 125 of FIGS. 1 and 2. In addition, the description of the storage controller 125 references elements of FIGS. 1 and 2, like elements referring to like numbers.

The storage controller 125 includes a processor module 405, a memory module 410, a bridge module 415, a network interface module 420, and a storage interface module 425. In addition, the network interface module 420 is shown in communication with a storage server 115 and the storage interface module is depicted in communication with one or more storage devices 145.

The processor module 405, memory module 410, bridge module 415, network interface module 420, and storage interface module 425 may be fabricated of semiconductor gates on one or more semiconductor substrates. Each semiconductor substrate may be packaged in one or more semiconductor devices mounted on circuit cards. Connections between the processor module 405, the memory module 410, the bridge module 415, the network interface module 420, and the storage interface module 425 may be through semiconductor metal layers, substrate to substrate wiring, or circuit card traces or wires connecting the semiconductor devices.

The memory module 410 stores software instructions and data. The processor module 405 executes the software instructions and manipulates the data as is well know to those skilled in the art. The processor module 405 communicates with the network interface module 420 and the storage interface module 425 through the bridge module 415. In one embodiment, the memory module 410 stores and the processor module 405 executes one or more software processes embodying the copy module 305, detection module 310, switch module 315, migration module 320, and tracking module 325 of FIG. 3.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
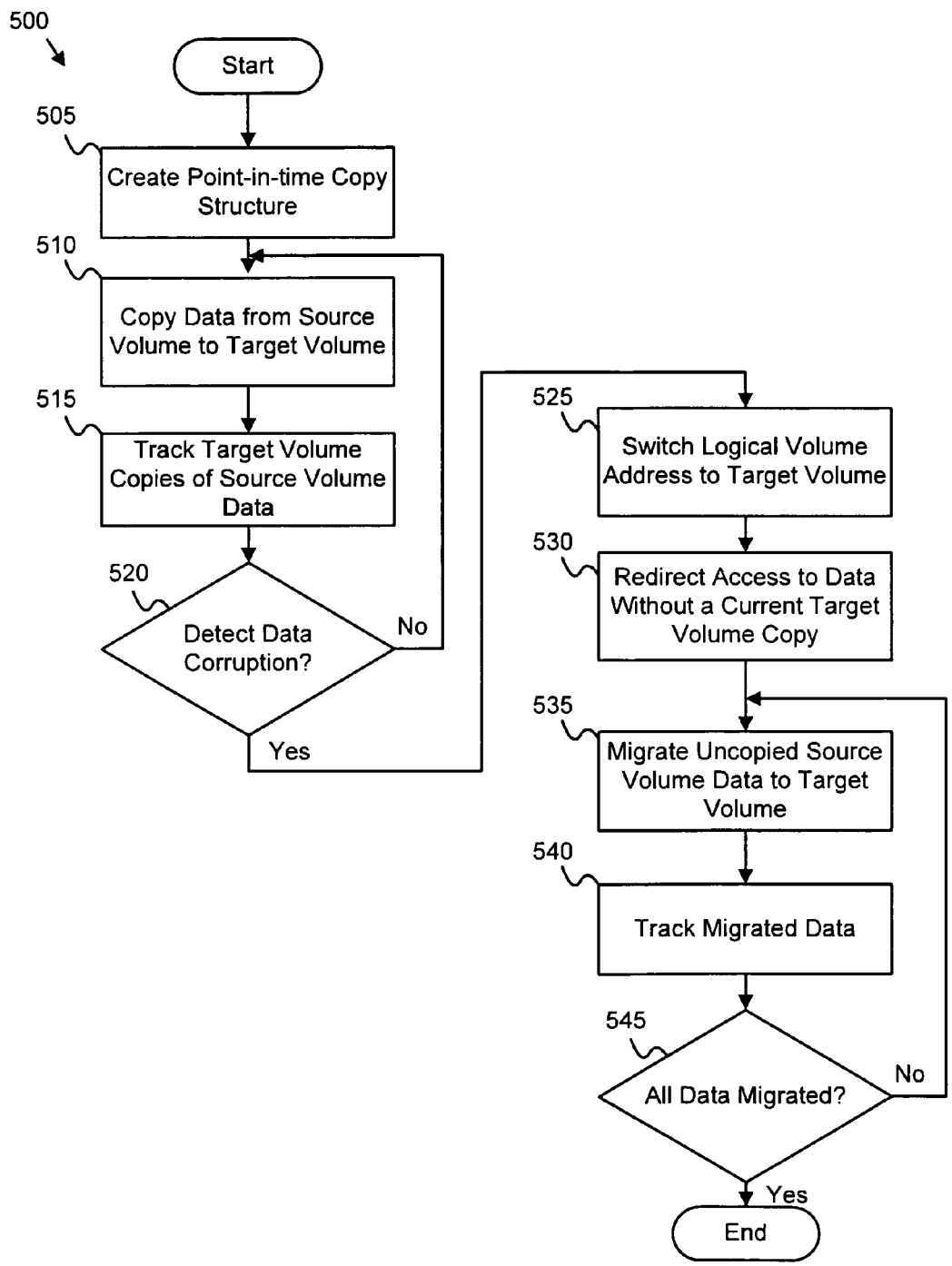
FIG. 5 is a schematic flow chart diagram illustrating one embodiment of a volume address switching method of the present invention.

FIG. 5 is a schematic flow chart diagram illustrating one embodiment of a volume address switching method 500 of the present invention. The method 500 substantially includes the steps to carry out the functions presented above with respect to the operation of the described apparatus 300, 400 and system 100, 200 of FIGS. 1-4. In addition, the method 500 refers to elements of FIGS. 1-4, like numbers referring to like elements.

The method 500 begins and a copy module 305 creates 505 a point-in-time copy structure of a source volume 205 at a target volume 210. For example, the copy module 305 may copy one or more directories and/or file tables from the source volume 205 to the target volume 210 such that the directory structure and file organization of the target volume 210 are substantially the same as the directory structure and file organization of the source volume 205.

In an alternate example, the copy module 305 assigns data block addresses to the target volume 210 such that each data block address of the source volume 205 has a corresponding data block address in the target volume 210. Thus a target volume data block with a hexadecimal address 'A1B778E3290' may correspond to a data block of the source volume 205 with the address 'A1B778E3290.'

In an alternate example, the copy module 305 may organize the data blocks in the target volume 210 with substantially the same the organization as the data blocks in the source volume 205. For example, a data block in the target volume 210 may share the least significant address values with a source volume data block. Thus if the block address of the source volume data block is the hexadecimal number 'A1B778E3290', the corresponding target volume data block may have the hexadecimal address '832478E3290' wherein the source volume data block and the target volume data block share the least significant address values '78E3290.'

In one embodiment, a migration module 320 copies 510 a data block from the source volume 205 to the target volume 210. The migration module 320 may copy 510 the data block to the point-in-time copy structure to create a point-in-time copy of the source volume 205.

In one example, the migration module 310 may copy 510 data from the source volume 205 to the target volume 210 by reading a portion of data from the first storage device 145a of FIG. 4 wherein the first storage device 145a includes the source volume 205. In addition the migration module 310 may store the portion of data in the memory module 410 and write the portion of data from the memory module 410 to the second storage device 145b of FIG. 4 where the second storage device 145b includes the target volume 210. Thus the migration module 310 may copy 510 the data from the source volume 205 to the target volume 210 by repeatedly copying portions of data to create 505 the just-in-time copy of the source volume 205.

In one embodiment, the tracking module 325 tracks 515 target volume copies of source volume data. For example, the tracking module 325 may identify each data block of the source volume 205. In addition, the tracking module 325 may determine if a current copy of the data block resides on the target volume 210.

For example, subsequent to the creation 505 of the point-in-time copy structure, no copies of source volume data blocks may reside in the target volume 210. When the migration module 310 copies 510 a first data block of the source volume 205 to the target volume 210, the tracking module 325 may recognize that the first data block has a current target volume copy.

In one embodiment, the tracking module 325 maintains a bit map of each data block in the source volume 205. Alternatively, the tracking module 325 may maintain an array of linked arrays with an array for each data block.

In an alternate embodiment, the tracking module 325 tracks 515 each directory and/or file of the source directory 205 without a current copy in the target volume 210. The tracking module 325 may recognize the directories and/or files of the source directory with current copies in the target volume 210.

A detection module 310 detects 520 data corruption in the source volume. In tone embodiment, the administrator notifies a software application of virus activity and/or an invalid transaction. The software application may declare the data to be corrupted and the detection module 310 may receive notice of the data corruption.

In one embodiment, the detection module 310 detects 520 the data corruption as a read and/or write error when accessing data in the source volume 205. For example, an operating system may comprise the detection module 310. The operating system may receive an error message if a read and/or write error occurs while accessing data. The detection module 310 may detect 520 the data corruption in response to the error.

In one embodiment, the detection module 310 detects 520 the data corruption as invalid data. For example, the software application such as a database application may comprise the detection module 310. If the software application reads invalid data from the source volume 205, the detection module 310 may detect 520 data corruption.

If the detection module 310 does not detect 520 data corruption, the migration module 320 continues to copy 510 data from the source volume 205 to the target volume 210. If the detection module 310 detects 520 data corruption, a switch module 315 switches 525 a logical volume address from a source volume address of the source volume 205 to a target volume address of the target volume 210.

In one embodiment, the logical volume address is initially configured to direct a data access to the source volume 205. The switch module 315 changes the logical volume address so that the logical volume address directs a data access to the target volume 210. For example, a storage controller 125 may receive data access requests such as to write data to or read data from the source volume 205. Each request may include a logical volume address. Initially, the logical volume address may be a source volume address associated the source volume 205.

For example, the storage controller 125 may associate the source volume with a source volume address of '196' while the storage controller 125 may associate the target volume with a target volume address of '197.' The source volume address may be the address of a storage device 145. In a certain embodiment, the storage controller 125 associates the source volume 205 and/or the target volume 210 with a plurality of storage device addresses. The switch module 315 switching 525 the logical volume address from the source volume address to the target volume address may change the logical volume address from '196' to '197,' redirected a data access for the source volume 205 to the target volume 210.

In one embodiment, the tracking module 325 redirects 530 an access for data without a target volume copy to the source volume 205. For example, the tracking module 325 may recognize that a first data block of the source volume 205 has no current copy in the target volume 210. If a DPD 105 attempts to access the first data block and the switch module 315 switches 525 the logical volume address from the source volume address to the target volume address, the tracking module 325 redirects 530 the access for the fist data block to the source volume 205.

In one embodiment, the tracking module 325 intercepts each access to data without a current copy. For example, the tracking module 325 may check each data block access attempt against a bit map that tracks data blocks with current copies in the target volume 210. If the tracking module 325 recognizes that a data block of an access attempt has no current copy, the tracking module 325 may intercept the access and modify the access. Returning to the example above, if the logical volume address is switched from the source volume address of '196' to the target volume address of '197,' the tracking module 325 may modify the access to the data block without a current copy by redirecting the access to the logical volume address of '196.'

In one embodiment, the migration module 320 migrates 535 data without a current copy in the target volume 210 to the target volume 210. For example, the migration module 230 may query the tracking module 325 for all data such as data blocks and/or directories and files without current target volume copies. The migration module 320 may further copy all data without current copies in the target volume 210 to the target volume 210.

In one embodiment, the tracking module 325 tracks 540 migrated data. For example, the tracking module 325 may change the bit map entry for each data block migrated from the source volume 205 to the target volume 210. In addition, the tracking module 325 may determine 545 if current copies of all data are migrated to the target volume 210. If the tracking module 325 determines 545 that all data is not migrated, the migration module 320 migrates 535 data without a current copy in the target volume 210 to the target volume 210. Alternatively, if the tracking module 325 determines 545 that all data is migrated, the method 500 terminates. The method 500 provides rapid access to the data of the target volume 210 by switching the logical volume address from the source volume address to the target volume address.

Figure 6A:
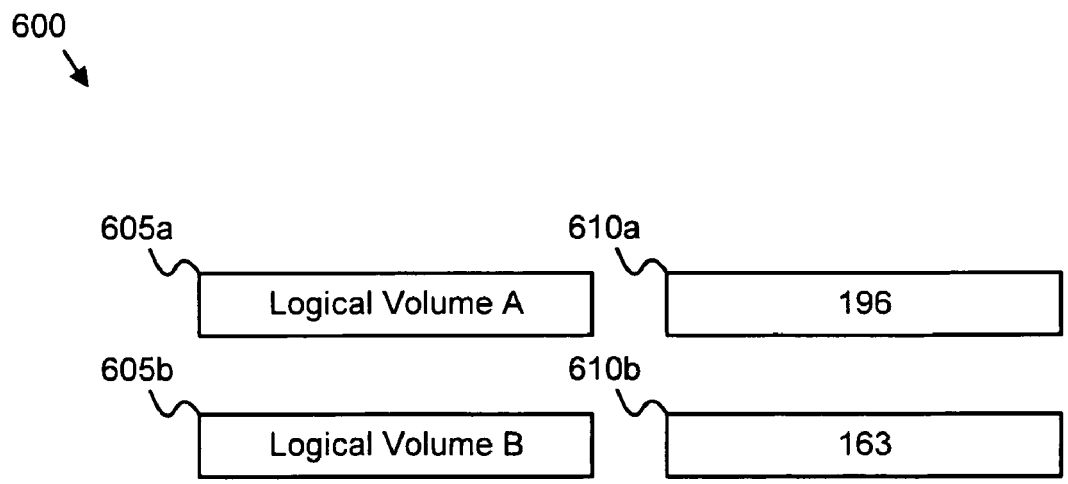
FIGS. 6a-6b are schematic block diagrams illustrating one embodiment of volume address data of the present invention.

FIG. 6a is a schematic block diagram illustrating one embodiment of volume address data 600 of the present invention. The elements of FIGS. 1-5 are referenced, like numbers referring to like elements. One or more logical volume fields 605 and one or more logical volume address fields 610 are depicted. The logical volume fields 605 and the logical volume address fields 610 may be data fields of the memory module 410 of the storage controller 125 of FIG. 4.

The volume address data 600 correlate logical volumes to logical volume addresses. Each logical volume field 605 stores a logical volume name. The logical volume name may be used by a DPD 105 to address a logical volume. The volume address field 610 stores an address of a logical volume such as the source volume 205 and/or the target volume 210. The logical volume address may comprise a range of physical addresses for one or more storage devices 145.

In one example, the DPD 105 may address data such as a data block or file by addressing the logical volume with the logical volume name 'Logical Volume A.' The storage controller 125 may receive a request to access data in 'Logical Volume A,' determine first logical volume field 605a stores the logical volume name 'Logical Volume A,' and retrieve the logical volume address '196' from a first logical volume address field 610a. In addition, the storage controller 125 may employ the logical volume address '196' to access the data for the DPD 105. In one embodiment, the logical volume address '196' is the logical volume address of the source volume 205.

Figure 6B:
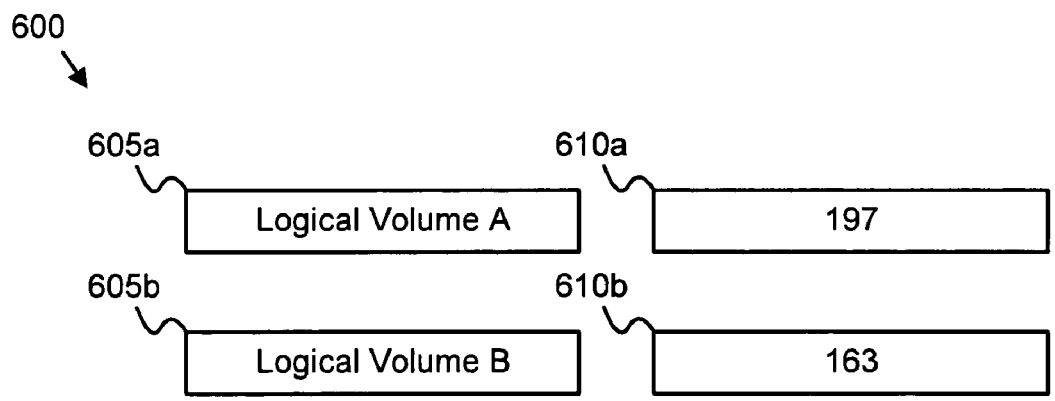

FIG. 6b is a schematic block diagram further illustrating one embodiment of volume address data 600 of the present invention. The logical volume fields 605 and logical volume address fields 610 of FIG. 6a are depicted. In addition, elements of FIGS. 1-5 are referenced, like numbers referring to like elements.

The switch module 315 switches 525 the value of the first logical volume address field 610a from a source volume address '196' of the source volume 205 to a target volume address '197' of the target volume 210. If a DPD 105 accesses 'Logical Volume A,' the storage controller 125 directs the access to the target volume 210 and the target volume address '197.' The switch is transparent to the DPD 105 and can be performed without interrupting DPD 105 access to data. Switching 525 the logical volume address from the source volume address to the target volume address supports rapid access to data backed up to the target volume 210.

The embodiment of the present invention switches a volume address association in a point-in-time copy relationship in response to data corruption to provide rapid access to data. In addition, the embodiment of the present invention may seamlessly recover the data. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to switch a volume address association in a point-in-time copy relationship, the apparatus comprising:
   a copy module configured to create a point-in-time copy structure of a source volume at a target volume;

a migration module configured to copy data from the source volume to the target volume;

a detection module configured to detect data corruption in the source volume;

a switch module configured to switch a logical volume address from a source volume address of the source volume to a target volume address of the target volume in response to detecting the data corruption, the switch module being configured to redirect an access request for source volume data directed to the source volume to the target volume in response to detecting the data corruption; and a tracking module configured to redirect the access request for source volume data redirected to the target volume to the source volume if the target volume does not have a current target volume copy of the requested source volume data;

wherein the copy module, migration module, detection module, and switch module each comprise at least one of logic hardware, and a computer processor and computer-readable storage medium storing executable code executed by the processor.

2. The apparatus of claim 1, wherein while data corruption is detected in the source volume by the detection module, the migration module is configured to copy data without a current target volume copy in the target volume from the source volume to the target volume.

3. The apparatus of claim 2, wherein the tracking module comprises a bit map configured to track the current target volume copies for a plurality of source volume data.

4. The apparatus of claim 1, wherein the migration module is further configured to migrate source volume data without a current target volume copy to the target volume.

5. The apparatus of claim 4, wherein the migration is a background operation.

6. The apparatus of claim 1, wherein a software application comprises the detection module.

7. The apparatus of claim 1, wherein an operating system comprises the detection module.

8. A computer readable storage medium tangibly embodying a program of machine-readable instructions executable by a digital processing apparatus to perform an operation to switch a volume address association in a point-in-time copy relationship, the operation comprising:

creating a point-in-time copy structure of a source volume at a target volume;

copying data from the source volume to the target volume;

generating a data access request directed to a logical volume address;

receiving the data access request over a storage network;

initially setting the logical volume address to a source volume address of the source volume;

detecting data corruption in the source volume;

switching the logical volume address from the source volume address of the source volume to a target volume address of the target volume in response to detecting the data corruption;

tracking a current target volume copy of source volume data; and redirecting the access request redirected to the target volume to the source volume if the current target volume copy does not include the data requested by the data access request.

9. The computer readable storage medium of claim 8, wherein the instructions further comprise an operation to track a current target volume copy of source volume data and redirect an access for source volume data without the current target volume copy to the source volume.

10. The computer readable storage medium of claim 9, wherein a bit map tracks the current target volume copies for a plurality of source volume data.

11. The computer readable storage medium of claim 10, wherein the instructions further comprise an operation to migrate each source volume data block without a target volume copy to the target volume.

12. The computer readable storage medium of claim 8, wherein a software application detects the data corruption.

13. The computer readable storage medium of claim 8, wherein an operating system detects the data corruption.

14. The computer readable storage medium of claim 8, wherein a storage controller maps the source volume address to a first physical volume address and the target volume address to a second physical address.

15. A system to switch a volume address association in a point-in-time copy relationship, the system comprising:

a source volume configured to store data, the source volume comprising at least a portion of a first data storage device;

a data processing device configured to generate a data access request directed to a logical volume address;

a target volume configured to store data, the target volume comprising at least a portion of at least one of the first data storage device and a second data storage device;

a detection module configured to detect data corruption in the source volume; and a storage controller configured to manage the source volume and the target volume, the storage controller configured to receive the data access request from the data processing device over a storage network, wherein the storage controller initially sets the logical volume address to a source volume address of the source volume, the storage controller further comprising:

a copy module configured to create a point-in-time copy structure of the source volume at the target volume;

a migration module configured to copy data from the source volume to the point-in-time copy structure of the target volume;

a switch module configured to switch the logical volume address from the source volume address of the source volume to a target volume address of the target volume in response to detecting the data corruption; and a tracking module configured to track a current target volume copy of source volume data and redirect an access for source volume data without the current target volume copy to the source volume.

16. The system of claim 15, wherein the migration module is further configured to migrate each source volume data block without a target volume copy to the target volume.

17. The system of claim 15, wherein a software application comprises the detection module.

18. The system of claim 15, wherein an operating system comprises the detection module.

19. The system of claim 15, wherein the storage controller comprises the detection module.

20. A method for deploying computer infrastructure, comprising integrating computer-readable code into a computing system, wherein the code in combination with the computing system is capable of performing the following:

creating a point-in-time copy structure of a source volume at a target volume;

copying data from the source volume to the point-in-time copy structure of the target volume;

detecting data corruption in the source volume;

switching a logical volume address from a source volume address of the source volume to a target volume address of the target volume in response to detecting the data corruption;

tracking current target volume copies of source volume data;

redirecting an access request for source volume data directed to the source volume to the target volume in response to detecting the data corruption;

redirecting the access request for source volume data redirected to the target volume back to the source volume if the target volume does not have a current target volume copy of the requested source volume data;

migrating each source volume data block without a target volume copy to the target volume as a background operation; and tracking migrated data.

* * * * *